(12) United States Patent
Koike et al.

(10) Patent No.: US 8,512,608 B2
(45) Date of Patent: Aug. 20, 2013

(54) INJECTION MOLDING METHOD AND INJECTION MOLDING DEVICE

(75) Inventors: Jun Koike, Sunto-Gun (JP); Harumichi Tokuyama, Odawara (JP); Harunobu Inami, Numazu (JP); Yasumasa Sugiyama, Numazu (JP); Mitsuru Koga, Mishima (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 190 days.

(21) Appl. No.: 13/108,437

(22) Filed: May 16, 2011

(65) Prior Publication Data

US 2011/0285046 A1  Nov. 24, 2011

(30) Foreign Application Priority Data

May 18, 2010  (JP) .................................. 2010-114642

(51) Int. Cl.
 *B29C 45/80* (2006.01)
(52) U.S. Cl.
 USPC ........ 264/40.5; 264/328.7; 425/150; 425/589
(58) Field of Classification Search
 USPC ...................... 264/40.5, 328.7; 425/150, 589
 See application file for complete search history.

(56) References Cited

U.S. PATENT DOCUMENTS

| | | | | |
|---|---|---|---|---|
| 4,519,763 A * | 5/1985 | Matsuda et al. | ........... | 425/192 R |
| 5,279,778 A * | 1/1994 | Taira et al. | .................. | 264/40.1 |
| 5,547,619 A * | 8/1996 | Obayashi | ..................... | 264/40.1 |
| 5,906,777 A * | 5/1999 | Kamiguchi et al. | ......... | 264/40.1 |
| 5,945,047 A * | 8/1999 | Yukihiro et al. | ............. | 264/40.5 |
| 7,097,791 B2 * | 8/2006 | Weinmann | ................... | 264/40.5 |
| 7,326,375 B2 | 2/2008 | Nishimoto | | |
| 7,704,423 B2 | 4/2010 | Takatori et al. | | |
| 2005/0230861 A1 | 10/2005 | Takatori et al. | | |
| 2008/0093756 A1 | 4/2008 | Nishimoto | | |
| 2008/0116597 A1 | 5/2008 | Nishimoto | | |
| 2008/0118594 A1 | 5/2008 | Nishimoto | | |

FOREIGN PATENT DOCUMENTS

| | | |
|---|---|---|
| CN | 1057984 | 1/1992 |
| CN | 164715 | 8/2005 |
| DE | 698 26 330 | 10/2005 |
| JP | 59-185637 | 10/1984 |
| JP | 10-329183 | 12/1998 |

(Continued)

OTHER PUBLICATIONS

English Languge Abstract of JP 2000-229342 published Aug. 22, 2000.

(Continued)

*Primary Examiner* — Jill Heitbrink
(74) *Attorney, Agent, or Firm* — DLA Piper LLP (US)

(57) ABSTRACT

An injection molding device comprises a mold-clamping device that operates in both of a mold-closing state in which a mold is closed under predetermined pressure and a micro mold-open state in which the mold is held in a state in which the mold is open from the mold-closing state by a predetermined amount, an injection device that molds a molded product by injecting a molding material into the mold set to the mold-closing state or the micro mold-open state and a controller that changes a stop position of the mold in the micro mold-open state in accordance with a change of a mold-closing position when the mold-closing position of the mold in the mold-closing state is changed.

12 Claims, 3 Drawing Sheets

(56) References Cited

FOREIGN PATENT DOCUMENTS

| JP | 2919250 | 4/1999 |
|---|---|---|
| JP | 2000-229342 | 8/2000 |
| JP | 2003-136569 | 5/2003 |
| JP | 2004-098582 | 4/2004 |
| JP | 2005-014471 | 1/2005 |
| JP | 3766316 | 4/2006 |
| JP | 2009-208412 | 9/2009 |

OTHER PUBLICATIONS

English Languge Abstract of JP 2004-098582 published Apr. 2, 2004.
English Languge Abstract of JP 59-185637 published Oct. 22, 1984.
English Languge Abstract of JP 2005-014471 published Jan. 20, 2005.
English Languge Abstract of JP 10-329183 published Dec. 15, 1998.
English Languge Translation of JP 2000-229342 published Aug. 22, 2000.
English Languge Translation of JP 2004-098582 published Apr. 2, 2004.
English Languge Translation of JP 2005-014471 published Jan. 20, 2005.
English Languge Translation of JP 10-329183 published Dec. 15, 1998.
English Language Abstract of JP 2009-208412 published on Sep. 17, 2009.
English Language Translation of JP 2009-208412 published on Sep. 17, 2009.
English Language Abstract of JP 2919250 published Apr. 23, 1999.
English Language Translation of JP 2919250 published Apr. 23, 1999.
English Language Abstract of JP 2003-136569 published May 14, 2003.
English Language Translation of JP 2003-136569 published May 14, 2003.
German Office Action issued in 10 2011 076 041.5 mailed Feb. 13, 2013.
English Language Translation of German Office Action issued in 10 2011 076 041.5 mailed Feb. 13, 2013.
English Language Abstract of DE 69826330 published Oct. 27, 2005.
English Language Abstract of JP 3766316 published Apr. 12, 2006.
English Language Translation of JP 3766316 published Apr. 12, 2006.
Chinese Office Action issued in CN 201110138238.7 on Jun. 21, 2013.
English Language Translation of Chinese Office Action issued in CN 201110138238.7 on Jun. 21, 2013.
English Language Abstract of CN 164715 published on Aug. 3, 2005.

\* cited by examiner

F I G. 3

INJECTION MOLDING METHOD AND INJECTION MOLDING DEVICE

CROSS-REFERENCE TO RELATED APPLICATIONS

This application is based upon and claims the benefit of priority from prior Japanese Patent Application No. 2010-114642, filed May 18, 2010, the entire contents of which are incorporated herein by reference.

BACKGROUND OF THE INVENTION

1. Field of the Invention

The present invention relates to an injection molding method and an injection molding device that inject a molding material such as resin, glass, and metal into a mold and also perform an operation to open the mold before or after the injection by a predetermined amount. More specifically, the present invention applies to an injection molding method that injects a molding material such as resin, glass, and metal while a mold is open by a predetermined amount and then provides a compressive force to the molding material by closing the mold or an injection molding method for foam molding by injecting a molding material into a mold and then opening the mold by a predetermined amount. In particular, the present invention relates to control to mold a molded product with low distortion or without welding and a technology capable of stabilizing the molded product at an early stage and continuing to mold with stability for a long period of time.

2. Description of the Related Art

An injection molding method is generally known as a method for molding by injecting a molding material such as resin, glass, and metal into a mold (see Jpn. Pat. Appln. KOKAI Publication No. 2003-136569, for example).

An injection compression molding method, which is a kind of the injection molding method, is widely used when optical products such as lenses requiring a precise form transfer or molded products in a large flat-plate shape are molded with low distortion. The injection compression molding method is a molding method for molding a product by filling a mold immediately before mold closing with a molding material and then closing the mold completely.

According to such a molding method, a mold is open by a predetermined amount in advance before injection so that fluidity of a molding material is improved, enabling efficient filling. After that, molded products in which molecular arrangement of the molding material is improved and having less pressure gradient and less distortion therein can be obtained by applying pressure to the molding material through compression.

In the injection compression molding, the position in which a mold is stopped immediately before mold closing (hereinafter, referred to as a "micro mold-open position") affects the pressure and the like during mold closing and so is precisely determined in advance based on the shape of a molded product, the molding material to be used, injection pressure and the like.

On the other hand, if pressure during mold closing is too high, the mold could be damaged. Thus, if, for example, the temperature of the mold rises and the mold-closing position of the mold fluctuates, the mold-closing position is changed in such a way that a mold-closing force becomes a desired value. If, in a mold-clamping device using, for example, a toggle mechanism, the mold-closing position fluctuates due to a temperature rise, adjustments are made in such a way that the mold-closing force during mold closing becomes a predetermined value by changing the stop position of a crosshead of the toggle mechanism.

However, even if the mold-closing position is changed in response to changes in temperature or the like, the micro mold-open position to keep the mold slightly open immediately before mold closing is not changed. Thus, a changed mold-closing position results in a shift of a micro mold-open amount (hereinafter, referred to as a "position shift") with regard to the mold-closing position. Accordingly, the filling amount fluctuates due to a change in filling resistance of the molding material and so the weight of molded products fluctuates, which makes it impossible to obtain molded products with stable quality.

To resolve the position shift, a control mechanism is separately needed to exercise feedback control using a position sensor provided in the mold and so on. However, if the position sensor is provided in the mold, there is a problem of increased costs and also a problem of a longer setup time before starting molding such as needed work to connect the sensor. Further, it is necessary to mount the position sensor on the mold and if the mold operates at high temperature, the position sensor is affected by the temperature, leading to decreased reliability.

BRIEF SUMMARY OF THE INVENTION

An object of the present invention is to provide an injection molding method and an injection molding device without the need for a position sensor that results in increased costs and capable of molding products of stable quality even if the mold-closing position is changed due to fluctuations in temperature or the like.

The present invention to achieve the object includes holding a mold in a micro mold-open state in which the mold is open from a mold-closing state by a predetermined amount from a mold-open state or the mold-closing state mold-closed under predetermined pressure; injecting a molding material into the mold in the micro mold-open state; molding a molded product in the mold-closing state by closing the mold under the predetermined pressure; and changing a stop position of the mold in the micro mold-open state in accordance with a change of a mold-closing position when the mold-closing position of the mold in the mold-closing state is changed.

The present invention to achieve the object also includes putting a mold into a mold-closing state in which the mold is closed under predetermined pressure; injecting a molding material into the mold in the mold-closing state; molding a molded product by changing the mold from the mold-closing state to a micro mold-open state in which the mold is open by a predetermined amount; and changing a stop position of the mold in the micro mold-open state in accordance with a change of a mold-closing position in the mold-closing state when the mold-closing position of the mold in the mold-closing state is changed.

The present invention to achieve the object also includes a mold-clamping device that operates in both of a mold-closing state in which a mold is closed under predetermined pressure and a micro mold-open state in which the mold is held in a state in which the mold is open from the mold-closing state by a predetermined amount; an injection device that molds a molded product by injecting a molding material into the mold set to the mold-closing state or the micro mold-open state; and a controller that changes a stop position of the mold in the micro mold-open state in accordance with a change of a mold-closing position when the mold-closing position of the mold in the mold-closing state is changed.

DETAILED DESCRIPTION OF THE INVENTION

Figure 1:
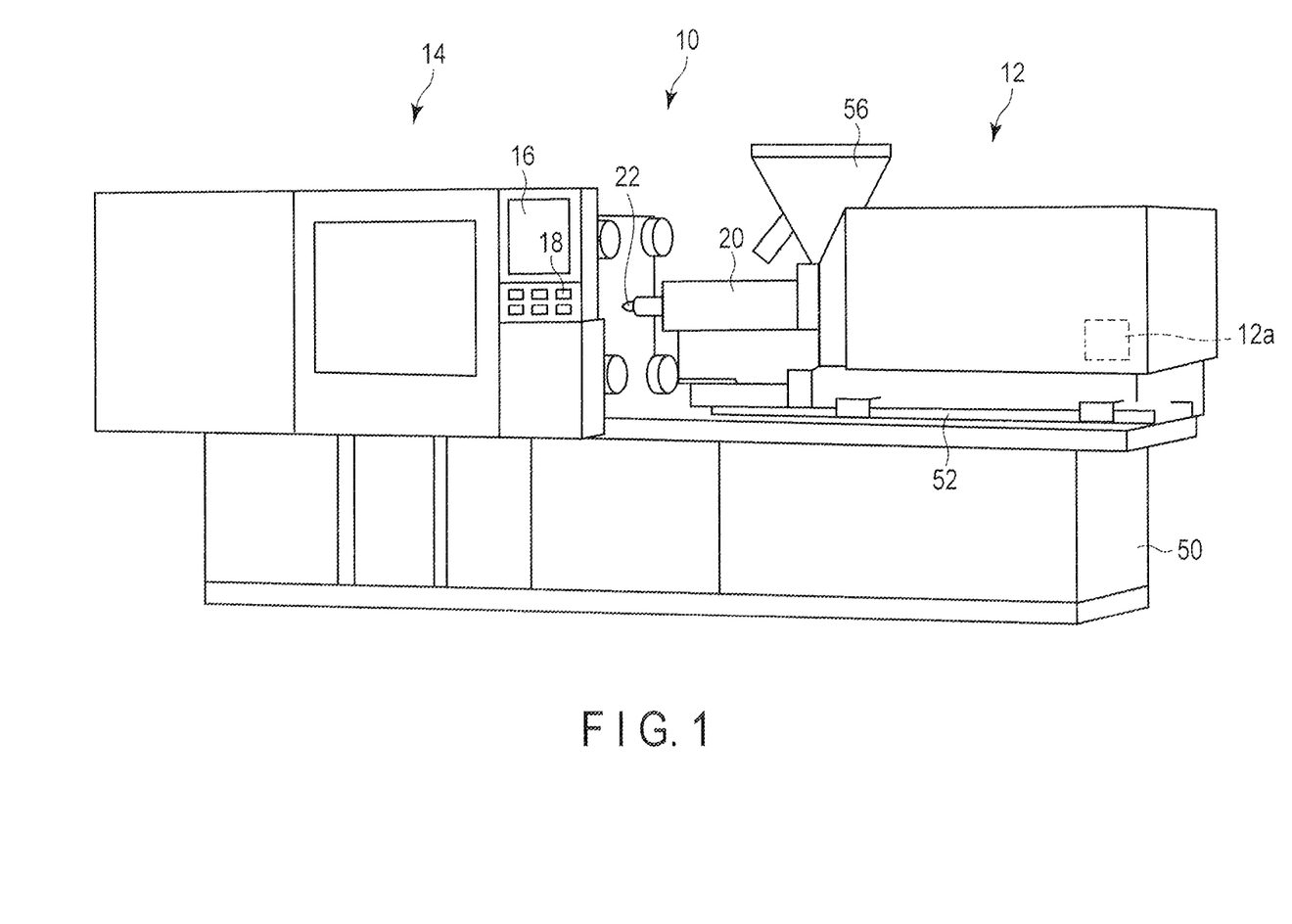
FIG. 1 is a perspective view illustrating an embodiment of an injection molding, device to execute an injection molding method according to the present invention.

FIG. 1 is a perspective view illustrating an injection molding device 10 to execute an injection molding method according to the present invention. The injection molding device 10 includes a base 50 and an injection device 12, a mold-clamping device 14, a display device 16, and a control panel 18 are provided on the base 50. The injection molding device 10 mainly molds molded products having fine shapes.

The injection device 12 includes a cylinder 20, a screw provided in such a way to be able to rotate and reciprocate inside the cylinder 20, a screw driving mechanism to rotate and reciprocate the screw inside the cylinder 20, and a heating device to heat the cylinder 20, which are installed freely movably on a rail 52. The injection device 12 is controlled by an injection controller 12a operating in cooperation with a mold controller 54 described later, melts a molding material inside the cylinder 20, and injects a molten molding material toward a cavity of a mold 24 (see FIG. 2) mold-closed by the mold-clamping device 14 through a nozzle 22 provided at a tip thereof.

The display device 16 and the control panel 18 are installed between the injection device 12 and the mold-clamping device 14. Incidentally, the injection device 12 and the mold-clamping device 14 in FIG. 1 are each in a state of being wrapped suitably in a cover.

Figure 2:
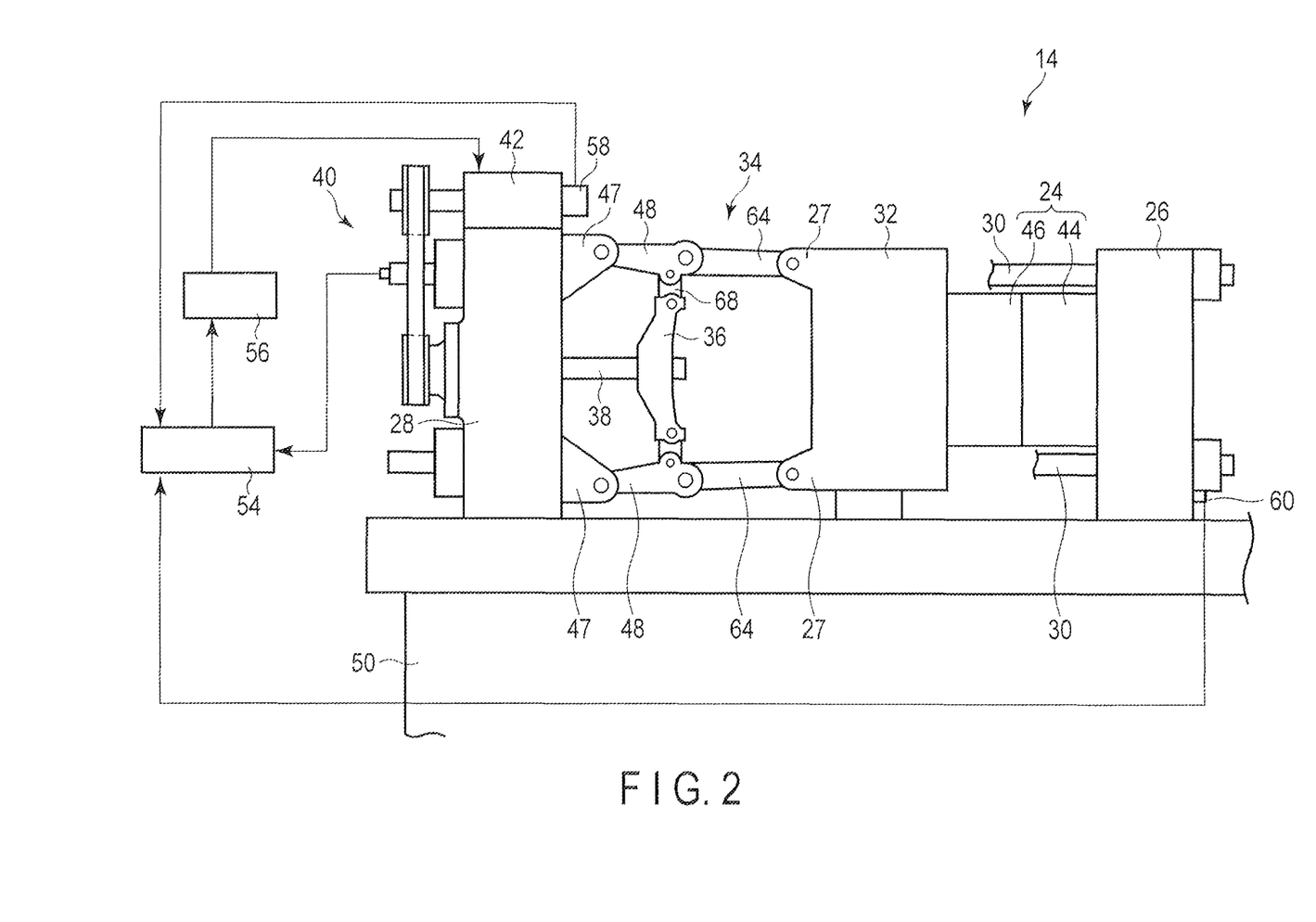
FIG. 2 is a diagram illustrating an embodiment of a mold-clamping device integrated into the injection molding device.

FIG. 2 illustrates an outline of the mold-clamping device 14. It is assumed below for the mold-clamping device 14 that the side of the injection device 12 is the front side and the other side is the rear side.

The mold-clamping device 14 includes a fixed die plate 26 and a rear plate 28 provided on the base 50. The fixed die plate 26 is positioned on the front side and fixed onto the base 50. The rear plate 28 is positioned on the rear side and movably attached to the base 50. The fixed die plate 26 and the rear plate 28 are linked and fixed by four parallel tie bars 30 provided at four corners thereof.

The fixed die plate 26 freely removably holds a fixed mold 44 described later. A movable die plate 32 is provided between the fixed die plate 26 and the rear plate 28. The movable die plate 32 is attached to the base 50 in a way to be movable along the tie bars 30. The movable die plate 32 freely removably holds a movable mold 46 described later.

A toggle mechanism 34 to reciprocate the movable die plate 32 is provided between the rear plate 28 and the movable die plate 32. The toggle mechanism 34 is composed of a crosshead 36, a toggle lever 48, a toggle arm 64 and the like and a rear end thereof is linked to the front side of the rear plate 28 and a front end thereof is linked to the rear side of the movable die plate 32.

A female screw of a ball screw mechanism is provided in a center section of the crosshead 36 and a screw axis 38 of the ball screw mechanism is screwed into the female screw. The screw axis 38 is attached to the rear plate 28 in a way to be rotatable around a center axis and is suitably driven to rotate by a motor 42 provided on the rear plate 28 via a transmission mechanism 40.

An end of a coupling piece 68 is each attached to an upper end and a lower end of the crosshead 36. The toggle lever 48 is coupled to the coupling piece 68 and an end of the toggle lever 48 is freely rotatably attached to a supporting section 47 of the rear plate 28. The toggle levers 48 are provided as a pair substantially symmetrically with respect to a horizontal line.

One end of the toggle arm 64 is freely rotatably coupled to the toggle lever 48 and the other end thereof is freely rotatably attached to the supporting section 27 of the movable die plate 32. Like the toggle levers 48, the toggle arms 64 are provided as a pair symmetrically with respect to a horizontal line. Incidentally, the toggle levers 48 and the like may be provided as a pair symmetrically with respect to a vertical line.

The mold 24 is composed of the fixed mold 44 and the movable mold 46 and a combination of the fixed mold 44 and the movable mold 46 internally forms a cavity in a predetermined shape. The fixed mold 44 is fixed, as described above, to the fixed die plate 26 and the movable mold 46 is fixed, as described above, to the movable die plate 32.

The mold controller 54 will be described. The mold controller 54 is a controller to mainly control the mold-clamping device 14, includes a motor driver 56, and drives the motor 42 to rotate via the motor driver 56. A rotation sensor 58 provided in the motor 42 and a pressure sensor 60 provided near the tie bar 30 are connected to the mold controller 54 to input rotation information of the motor 42 from the rotation sensor 58 and mold-closing force information of the mold-clamping device 14 from the pressure sensor 60. The motor 42 may be, in addition to a common motor, a servo motor or the like.

Next, the injection compression molding method by the injection molding device 10 will be described. The mold-clamping device 14 actuates the toggle mechanism 34 to close the mold 24. The mold 24 is closed by driving the motor 42 closes the mold until the fixed mold 44 and the movable mold 46 are fastened under predetermined pressure. After that, the mold is opened a little so that the cavity volume of the mold 24 increases slightly. Accordingly, the fixed mold 44 and the movable mold 46 are placed opposite to each other in a state opened a little by a predetermined amount. Such a state is called a "micro mold-open state".

After that, a molten molding material is injected into the cavity from the injection device 12. Then, after the cavity is filled with the molten molding material, the motor 42 is driven to fasten the mold 24 again by moving the crosshead 36 forward. At this point, the mold 24 is closed until the mold-closing force reaches a predetermined value.

When the molten molding material is cooled and became solidified inside the mold 24, the motor 42 is actuated in a direction opposite to the direction of mold closing to open the mold 24 and to pick up a molded product from the mold 24. Accordingly, one cycle of injection molding is completed and a desired molded product can be molded by the injection compression molding method.

Henceforth, the one cycle is repeated to perform injection molding so that desired molded products can be molded continuously. In the injection molding cycle, the position in which the fixed mold 44 and the movable mold 46 are mold-closed for the first time with a predetermined value or the position in which mold closing is performed once with a predetermined value before the injection molding cycle is called a normal mold-closing position.

On the other hand, if the temperature of the mold 24 rises and the mold 24 or the fixed die plate 26 thermally expands while the injection molding cycle is continuously repeated; the mold-closing force of the mold 24 may be excessive if movement of the movable mold 46 is stopped in the normal mold-closing position of the mold 24. Thus, the mold-closing position is corrected while receiving feedback of the mold-closing force to adjust the position of the crosshead 36 during mold closing, that is, the stop position of the motor 42 so that the mold-closing force reaches predetermined pressure.

Further, if the mold-closing position during mold closing is changed, the stop position of the movable mold 46 to form a micro mold-open state is changed. More specifically, if the stop position of the crosshead 36 during mold closing is changed, the stop position of the crosshead 36 when a micro mold-open state is formed is changed in accordance with a change amount of the stop position of the crosshead 36 during mold closing.

Figure 3:
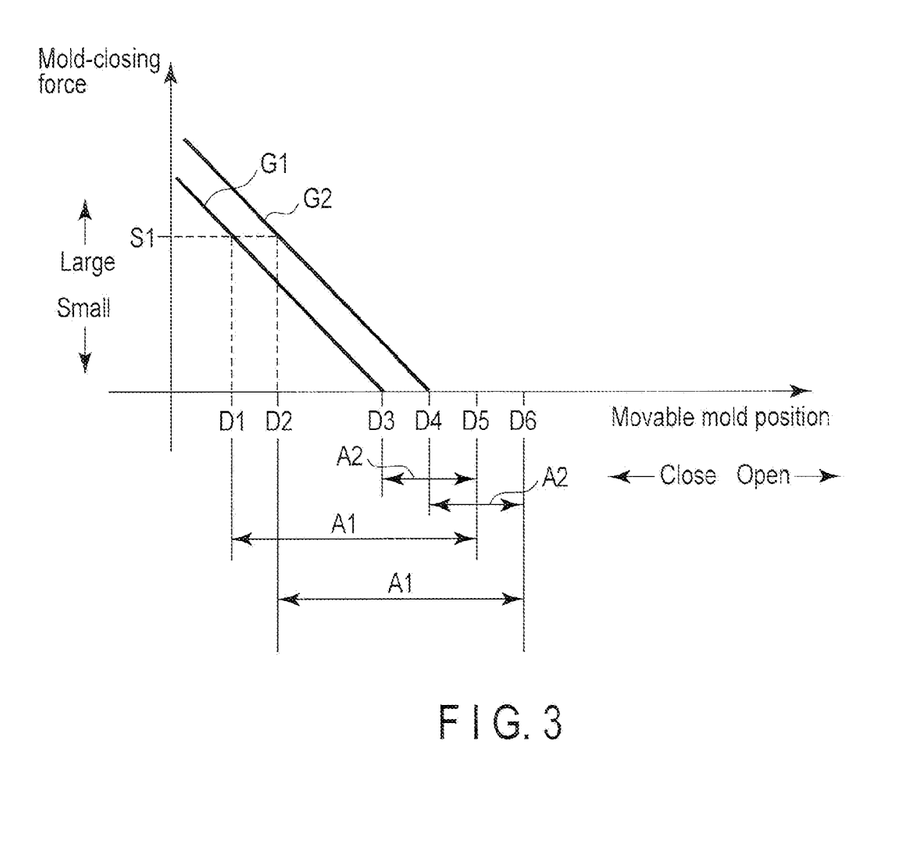
FIG. 3 is a graph illustrating a mold-closing operation of the mold-clamping device.

How to change the stop position of the movable mold 46 will be described by using FIG. 3. The horizontal axis of FIG. 3 is the position of the movable mold 46 and the vertical axis of FIG. 3 is the mold-closing force of the mold 24. G1 is a graph illustrating an initial mold-closing force of the injection molding cycle or a mold-closing force when mold closing is performed once before the injection molding cycle and G2 is a graph illustrating a mold-closing force when the temperature of the mold 24 rises or after the temperature thereof rises in the injection molding cycle. The right side of the horizontal axis is an opening direction of the mold 24 and the left side of the horizontal axis is a closing direction. The opening and closing direction is opposite to the moving direction of the movable mold 46 in FIG. 2.

The initial mold closing of the injection molding cycle or the mold closing performed once before the injection molding cycle will be described by using G1. If the mold 24 is closed from a state in which the mold 24 is open by a mold-closing operation, the movable mold 46 comes into contact (touch state) with the fixed mold 44 at D3. If, after that, the movable mold 46 is further moved forward, the mold-closing force increases according to the graph of G1. If the mold-closing force in a normal mold-closing state is S1, the mold-closing force reaches the predetermined value when the movable mold 46 moves to D1 and the motor 42 stops and forward movement of the movable mold 46 is also stopped. That is, D1 is set as the normal mold-closing position in G1.

If the micro mold-open amount of the mold 24 is A1, the position of D5, which is a position returned from D1 by the length of A1 in the mold-opening direction, becomes the micro mold-open position. The length from the contact position D3 with the fixed mold 44 to the micro mold-open position D5 (hereinafter, referred to as a "micro actual-mold-open amount") becomes A2.

Therefore, at the beginning of molding, the movable mold 46 is once closed up to the position of D1, which is the normal mold-closing position, by an operation of the crosshead 36 and then, a slight mold-opening operation up to the position of D5 is performed to form a micro mold-open state before a molding material being injected into the mold 24 from the injection device 12. The amount of rotation of the motor 42 with which the movable mold 46 is located at D1 or D5, that is, the position of the crosshead 36 is determined by conversion from a correspondence table or correspondence graph showing a position relationship between the crosshead 36 and the movable die plate 32 or a correspondence table or correspondence graph showing a position relationship between the crosshead 36 and the movable mold 46.

If the mold 24 is filled with a molding material in a micro mold-open state, the crosshead 36 is operated again to move the movable mold 46 to D1, that is, the normal mold-closing position in the mold-closing direction. The molding material is cooled and became solidified in the position and then, the movable mold 46 is moved in the mold-opening direction to pick up a molded product from inside the mold 24.

It is assumed, on the other hand, that the temperature of the mold 24 or the like changes during the injection molding cycle operation so that the relationship between the position of the movable mold 46 and the mold-closing force changes to G2. Accordingly, the contact (touch) position of the movable mold 46 and the fixed mold 44 after the temperature of the mold 24 or the like changes is changed from D3 to D4. If the relationship between the position of the movable mold 46 and the mold-closing force changes to G2, a predetermined mold-closing force S1 is generated, as shown in FIG. 3, in the position of D2 and the mold-closing force will be excessive if the movable mold 46 is moved to D1. Thus, the mold-closing position is changed from the normal mold-closing position D1 to the position of D2 (the mold-closing position to obtain the predetermined mold-closing force after the temperature of the mold 24 or the like changes) while receiving feedback of the mold-closing force, so as to obtain the predetermined mold-closing force S1.

Then, with the change of the mold-closing position to obtain the predetermined mold-closing force from D1 to D2, the micro mold-open position is set to D6 obtained by adding the distance equal to the mold-open amount A1 from D1 to D5 to D2. Accordingly, micro mold-opening occurs by the same amount as the micro actual-mold-open amount A2 at the beginning of molding also in the micro mold-opening operation after the temperature of the mold 24 or the like changes. That is, the length from the contact (touch) position D4 of the movable mold 46 and the fixed mold 44 after the temperature of the mold 24 or the like changes to the micro mold-open position D6 becomes A2. In the micro mold-opening operation, the motor 42 is driven while feedback targeting D6 is controlled.

Therefore, after the temperature of the mold 24 or the like changes, the mold 24 is closed from an open state of the mold 24 up to the position of D2 in which the predetermined mold-closing force is generated by driving of the motor 42 or the like. After that, a micro mold-opening operation to open the mold slightly is performed by driving the motor 42 in a direction opposite to the direction of mold closing to move the movable mold 46 to the micro mold-open position D6. Then, when the movable mold 46 reaches D6, the motor 42 is stopped and the molding material is injected from the injection device 12. After being filled with the molding material, the movable mold 46 moves to D2 again and the molding material is cooled and became solidified in a state of mold closing with the predetermined mold-closing force to mold a molded product.

Accordingly, the mold-open amount A1 in a micro mold-open state can be made constant even if the normal mold-closing position is changed due to a change in temperature or the like. Consequently, the micro actual-mold-open amount A2 can also be made constant even if the temperature of the mold 24 or the like changes.

Therefore, even if the thickness of the mold 24 fluctuates due to a change in temperature or the like, the cavity volume in micro mold-opening has a fixed value so that an inflow state of the molding material and a compression state by mold closing thereafter can be set to desired states, which enables molding of molded products with stable quality.

Instead of the above injection molding cycle, an injection molding cycle described below may be used for injection compression molding because of operation differences in injection compression molding or in order to reduce the molding cycle time.

First, the movable mold 46 is moved in the mold-closing direction from a mold-open state to close the mold up to the position in which the mold is open by the predetermined micro mold-open amount. After that, a molten molding material is injected into the mold 24 from the injection device 12. Then, a mold-closing operation is performed to close until the mold-closing force is reached to the predetermined pressure. After that, the molding material is cooled and became solidified and then, the movable mold 46 is moved in the mold-opening direction to pick up a molded product from inside the mold 24. The injection molding cycle is thereby formed.

In this case, data of the mold-closing position in the previous cycle or a plurality of pieces of data of the mold-closing positions in several past injection molding cycles (data of the mold-closing position in the mold-closing operation performed before the molding cycle is used for the first mold closing of the molding cycle. That is, data of the normal mold-closing position is used for the first mold closing) is saved in a storage unit inside the mold controller 54 and a difference between data of the normal mold-closing position and a data of the mold-closing position in the previous cycle or an average value of the plurality of pieces of data of the mold-closing positions in several past injection molding cycles is added to a mold-open amount determined in advance in the next cycle (including the first molding cycle) to define the obtained value as a predetermined micro mold-open amount.

When this method is used, the predetermined micro mold-open amount is determined by using data of the previous mold-closing position and thus, a small amount of error may be contained but the error is very small and within an allowable range. If the error is beyond the allowable range, the normal mold-closing position is determined again by the injection compression molding method described above having an operation to bring the mold to the micro mold-open position after mold closing being performed once if the method can be used. If the method cannot be applied, the normal mold-closing position is replaced by data of the previous mold-closing position.

The allowable range is decided whether a difference between a data of the mold-closing position in the previous cycle or an average value of the plurality of pieces of data of the mold-closing positions in several past injection molding cycles and a data of the mold-closing position used during the previous cycle, which is two cycles before at the present time, or an average value of the plurality of pieces of data of the mold-closing positions in several past injection molding cycles used during the previous cycle, which are up to two cycles before at the present time, is within a determined range.

In the above example, the position of the crosshead 36 is used as a reference to form a mold-closing position, a micro mold-open state, and a micro mold-open position, but the present invention is not limited to such an example. Other examples of the injection molding method and the injection molding device will be described below.

For example, the position of the movable die plate 32 may be used as a reference to retain the micro mold-open state in a fixed state. That is, the position of the movable die plate 32 is used as a reference to calculate and set the normal mold-closing position, mold-open amount in a micro mold-open state, change amount and the like. Then, the relationship between the position of the movable die plate 32 and the position of the crosshead 36 is determined by using a correspondence table or correspondence graph.

The position of the crosshead 36, that is, the amount of rotation of the motor 42 is calculated by using a conversion table or the like in such a way that the movable die plate 32 performs a predetermined operation. Then, the motor 42 is driven while feedback control of the motor 42 is exercised so that the calculated rotation of the motor 42 is obtained to move the movable die plate 32. Also in this manner, stable injection molding can be performed by causing the mold 24 to perform a desired operation.

Further in the present embodiment, the mold 24 may be closed in such a way that the predetermined mold-closing force is reached so that the mold-closing position thereof is used as a reference to open the mold up to the position that forms a micro mold-open state for injection. Then, the mold 24 can be caused to operate to perform injection compression molding by using the mold-closing position that always provides the normal mold-closing force as a reference without being affected by the injection amount of the molding material in the cavity.

In the present invention, as described above, the stop position of the mold in a micro mold-open state is changed in accordance with the mold-closing position during mold closing and thus, the micro mold-open amount is always an appropriate value. Therefore, compression conditions for molding become stable so that molded products with stable quality can be molded. Moreover, the position is changed according to fluctuations of the mold-closing force and thus, an expensive position sensor is not needed, resulting in no increase of cost of the injection molding device and molded products. Furthermore, even if the mold rises to a high temperature, in contrast to the position sensor, precise and stable molding can be performed due to resistance to heat.

An injection molding device whose mold-closing force feedback control is standardized can control a micro mold-opening operation with stability for a long period of time without providing another sensor in a mold.

In the above examples, the injection compression molding is taken as an example, but the present invention may also be used for other injection molding methods having a micro mold-opening operation such as injection foam molding, that is, a process that creates a state in which the mold is open by a predetermined amount from a predetermined mold-closing state or a process that creates a state in which the mold is more open than the predetermined mold-closing state by the predetermined amount from a mold-open state. In the injection foam molding, injection occurs after the mold being closed by a mold-closing operation with a predetermined mold-closing force and a micro mold-opening operation is performed after or simultaneously with the injection to foam a molding material in the mold.

That is, in the injection foam molding, a mold is filled with a molding material after the mold is closed by a mold-closing operation with a predetermined mold-closing force and thereafter or simultaneously with injection/filling, a micro mold-opening operation shown in an embodiment or a micro mold-opening operation using a method similar to the method of the micro mold-opening operation performed in a plurality of other examples shown above is performed on the mold to foam the molding material.

An injection molding method having a micro mold-opening operation, though not applicable to injection foam molding or injection compression molding, can cause a micro mold-opening operation shown in an embodiment or a micro mold-opening operation using a method similar to the method of the micro mold-opening operation performed in a plurality of other examples shown above. That is, the present invention can be applied to any injection molding method having a micro mold-open state for a micro mold-opening operation.

The mold controller 14 may exercise control by oil pressure control using oil pressure, instead of electric power using a motor.

What is claimed is:

1. An injection molding method, comprising:
   putting a mold into a mold-closing state in which the mold is closed under predetermined pressure; and
   holding the mold in a micro mold-open state in which the mold is open by a predetermined amount from the mold-closing state mold-closed under predetermined pressure;
   the injection molding method further comprising:
   holding the mold in the micro mold-open state via the mold-closing state, injecting a molding material into the mold in the micro mold-open state, and molding a molded product by closing the mold under the predetermined pressure; or
   putting the mold in the mold-closed state from a mold-open state, injecting the molding material into the mold in the mold-closed state, and molding a molded product by holding the mold in the micro-open state subsequently, wherein
   a stop position of the mold in the micro mold-open state is changed in accordance with a change of a mold-closing position in the mold-closing state when the mold-closing position of the mold in the mold-closing state is changed.

2. The injection molding method according to claim 1, further comprising:
   changing a stop position of the mold in the micro mold-open state in accordance with a change of a mold-closed position in the mold-closing state when the mold-closing position of the mold in the mold-closing state is changed, and
   maintaining a mold-open amount of the mold in the micro mold-open state constant regardless of the mold-closing position in the mold-closing state when the stop position of the mold in the micro mold-open state is changed.

3. The injection molding method according to claim 1, further comprising:
   causing a toggle mechanism including a crosshead to open/close the mold; and
   setting the mold-closing position of the mold in the mold-closing state and the stop position of the mold in the micro mold-open state based on a position of the crosshead.

4. The injection molding method according to claim 1, further comprising:
   causing a toggle mechanism including a crosshead to open/close the mold;
   measuring a mold-closing force of the mold; and
   setting the stop position of the mold in the micro mold-open state by using a position of the crosshead when the measured mold-closing force becomes a predetermined value as a reference.

5. The injection molding method according to claim 1, further comprising:
   causing a toggle mechanism including a crosshead and whose one end is coupled to a movable die plate to open/close the mold which includes a fixed mold attached to a fixed die plate and a movable mold attached to the movable die plate; and
   setting the mold-closing position of the mold in the mold-closing state and the stop position of the mold in the micro mold-open state based on a position of the movable die plate.

6. The injection molding method according to claim 1, further comprising:
   causing a toggle mechanism including a crosshead and whose one end is coupled to a movable die plate to open/close the mold which includes a fixed mold attached to a fixed die plate and a movable mold attached to the movable die plate;
   measuring a mold-closing force of the mold to determining a position of the movable die plate when the measured mold-closing force becomes a predetermined value, and
   setting the stop position of the mold in the micro mold-open state by using the determined position of the movable die plate as a reference.

7. An injection molding device, comprising:
   a mold-clamping device and an injection device, wherein
   the mold-clamping device operates in both of a mold-closing state in which a mold is closed under predetermined pressure and a micro mold-open state in which the mold is held in a state in which the mold is open from the mold-closing state by a predetermined amount,
   the injection device molds a molded product by injecting a molding material into the mold set to the mold-closing state or the micro mold-open state and
   a stop position of the mold in the micro mold-open state is changed accordance with change of a mold-closing position when the mold-closing position of the mold in the mold-closing state is changed.

8. The injection molding device according to claim 7, wherein
   the predetermined mold-open amount of the mold in the micro mold-open state is maintained constant regardless of the mold-closing position in the mold-closing state.

9. The injection molding device according to claim 7, further comprising:
   a toggle mechanism that performs an opening/closing operation of the mold and includes a crosshead, wherein
   the mold-closing position of the mold in the mold-closing state and the stop position of the mold in the micro mold-open state are based on a position of the crosshead.

10. The injection molding device according to claim 7, further comprising:
    a toggle mechanism that performs an opening/closing operation of the mold and includes a crosshead; and
    a pressure sensor that measures a mold-closing force of the mold, wherein
    the stop position of the mold in the micro mold-open state is set by using a position of the crosshead when the mold-closing force measured by the pressure sensor becomes a predetermined value as a reference.

11. The injection molding device according to claim 7, further comprising
    a mold including a fixed mold and a movable mold,
    a fixed die plate to which the fixed mold is attached;
    a movable die plate to which the movable mold is attached; and
    a toggle mechanism including a crosshead and whose one end is coupled to the movable die plate to perform an opening/closing operation of the mold, wherein
    the mold-closing position of the mold in the mold-closing state and the stop position of the mold in the micro mold-open state are set based on a position of the movable die plate.

12. The injection molding device according to claim 7, further comprising
- a mold including a fixed mold and a movable mold;
- a fixed die plate to which the fixed mold is attached;
- a movable die plate to which the movable mold is attached;
- a toggle mechanism including a crosshead and whose one end is coupled to the movable die plate to perform an opening/closing operation of the mold; and
- a pressure sensor that measures a mold-closing force of the mold, wherein
- a position of the movable die plate when the mold-closing force of the mold measured by the pressure sensor becomes a predetermined value is determined, and the stop position of the mold in the micro mold-open state is set by using the determined position of the movable die plate as a reference.

* * * * *